United States Patent Office 3,467,732
Patented Sept. 16, 1969

3,467,732
POLYMERS OF VINYL CHLORIDE BLENDED WITH CHLORINATED POLYMERS
David F. Schnebelen, Plaquemine, Warren L. Young, Baton Rouge, Robert R. Blanchard, Port Allen, and Glen H. Graham, Plaquemine, La., assignors to The Dow Chemical Company, Midland, Mich., a corporation of Delaware
No Drawing. Filed June 20, 1966, Ser. No. 558,596
Int. Cl. C08f 29/24
U.S. Cl. 260—897          6 Claims

ABSTRACT OF THE DISCLOSURE

This invention relates to blends of vinyl chloride polymers and certain chlorinated olefin polymers. More particularly, it is directed to vinyl chloride polymer compositions containing from about 2.5 to 10 parts by weight of certain highly specific chlorinated olefin polymers wherein such chlorinated olefin polymers are of essentially linear structure and are characterized by having specified molecular weights, chlorine contents and modulus properties. These polymer blends have unexpectedly high impact strength values and are particularly useful for the preparation of essentially rigid articles such as pipes, tubing and blown bottles and the like.

---

The incorporation of chlorinated olefin polymers, such as chlorinated polyethylene, in vinyl chloride polymers is known. The resulting polymer blends, as compared with the vinyl chloride polymer constituent of such blends, have higher shock resistance (measured by notched impact strength), lower tensile strength and lower rigidity (measured by flexural modulus and heat deflection temperatures). Several serious shortcomings are associated with the known blends of vinyl chloride polymers and chlorinated olefin polymers. For example, heretofore, it has been extremely difficult to obtain notched impact strength values of the vinyl chloride polymer constituent when utilizing less than about 10 percent by weight of the chlorinated olefin polymer in the polymeric blend. Further, utilization of such chlorinated olefin polymers in amounts necessary to obtain significantly improved notched impact strength disadvantageously lowers the tensile strength and rigidity of the vinyl chloride polymer included in the polymer blend. The relatively low tensile strength and rigidity of such prior known polymer blends limit the usefulness of the blends in the fabrication of many types of plastic articles such as pipe, profile extrusions, blown bottles, etc.

It is an object of the invention to provide vinyl chloride polymer blends containing minor but effective amounts of certain chlorinated olefin polymers, which polymer blends have significantly improved notched impact strengths and excellent processability while maintaining desirably high tensile strengths, flexural moduli and resistance to heat induced deflection.

Other objects and advantages of this invention will become apparent from the following detailed description thereof.

These objects are realized, according to this invention, by forming a composition comprising an intimate admixture of (1) a vinyl chloride polymer containing at least about 80 weight percent of polymerized vinyl chloride in the polymer molecule (with the remainder being at least one monoethylenically unsaturated comonomer as hereinafter more fully described), and (2) between about 2.5 and 10 parts by weight, based on 100 parts by weight of the vinyl chloride polymer, of a chlorinated olefin polymer obtained by practice of a chlorination procedure which comprehends the suspension chlorination in an inert medium of finely divided olefin polymers having a molecular weight of less than about 1,000,000 and preferably between about 20,000 and 400,000, which contain at least about 90 mole percent ethylene with the remainder being one or more ethylenically unsaturated comonomers, to a desired total of combined chlorine content, wherein such polyolefin is first chlorinated at a temperature up to about 110° C., for a period sufficient to provide a chlorine content of not more than about 25 weight percent chlorine, based on the total weight of the polymer; followed by the sequential suspension chlorination of such polymer, in a particulate form, at a temperautre above that employed for the herein described first chlorination, but below the the temperature at which the crystalline polymer has completely melted, for a period sufficient to provide a combined chlorine content of between about 20 and 38 weight percent, based on the total weight of the polymer, and wherein at least about 12 percent by weight of the chemically combined chlorine is introduced during the sequential chlorination.

The vinyl chloride polymer included in the polymer blends may be rigid or essentially rigid vinyl chloride polymer such as vinyl chloride homopolymers and interpolymers of vinyl chloride with interpolymerizable monomers such as vinyl esters of organic acids containing 1 to 18 carbon atoms, e.g., vinyl acetate, vinyl stearate, and so forth; vinylidene chloride; symmetrical dichloroethylene; acrylonitrile; methacrylonitrile; alkyl acrylate esters in which the alkyl group contains 1 to 8 carbon atoms, e.g., methyl acrylate and butyl acrylate; the corresponding alkyl methacrylate esters; dialkyl esters of dibasic organic acids in which the alkyl groups contain 1 to 8 carbon atoms, e.g., dibutyl fumarate, diethyl maleate, and so forth. In general, where vinyl chloride interpolymers are employed, they should contain at least about 80 weight percent of vinyl chloride.

The polyolefinic materials to be chlorinated are preferably those distinct species and varieties of essentially linear and unbranched highly porous, comminuted polymers containing at least about 90 mole percent ethylene in the polymer molecule with the remainder being one or more ethylenically unsaturated comonomers, such polymers being prepared under the influence of catalyst systems comprising admixtures of strong reducing agents such as triethyl aluminum and compounds of Groups IV–B, V–B, and VI–B metals of the Periodic Systems, such as titanium tetrachloride, and the like, and having a molecular weight less than about 1,000,000 and preferably between about 20,000 and 400,000.

Exemplary of useful ethylenically unsaturated comonomers are the non-aromatic hydrocarbon olefins having 3 or more carbon atoms such as propylene, butene-1 and butene-2, and 1,7-octadiene and the like; cycloaliphatic olefins such as 1,5-cyclopentene and cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

As indicated, polyolefins having a molecular weight of from about 20,000 to less than about 1,000,000 may be used. It has been found, however, that the molecular weight of the polyolefin has some influence on the effectiveness of the chlorinated product obtained as an impact modifier for vinyl chloride polymers. More particularly, it has been found that the polyolefins described herein having molecular weights between about 20,000 to 40,000 are most effective when chlorinated to an extend of from about 20 to 28 percent by weight of chemically combined chlorine; polyolefins having a molecular weight of from about 40,000 to 100,000 are most effective when chlorinated to and extent of from about 25 and 35 percent by weight of chemically combined chlorine; and polyolefins having molecular weights of about 100,000 or more are most effective when chlorinated to an extent of from about 30 to 38 percent by weight of chemically combined chlorine.

Further, the chlorinated olefin polymers preferred for use in the present invention are characterized by having a 100 percent modulus (determined by ASTM Test No. D–412–62t) of less than about 425 p.s.i. when containing from 20 to 22 percent by weight of chemically combined chlorine; less than about 375 p.s.i. when containing from 22 to 25 percent by weight of chemically combined chlorine; less than about 300 p.s.i. when containing from 25 to 28 percent by weight of chemically combined chlorine; less than about 250 p.s.i. when containing from 28 to 30 percent by weight of chemically combined chlorine; and less than about 200 p.s.i. when containing from 30 to 38 percent by weight of chemically combined chlorine.

It is to be emphasized that the defined chlorination sequence and conditions must be rigidly followed to provide materials having optimum flexibility, elastomeric, elongatable, tensile strength and heat resistant features. Thus, it has unexpectedly been found that if the herein defined polyolefin is first chlorinated to an amount exceeding 25 percent chlorine, based on the total weight of the polymer, excesive amounts of polymeric materials having the chlorine substituents present in considerable block-like concentration or grouping along the polymer molecules are produced, with resultant losses in elasticity and resistance to the deleterious effects of heat.

Additionally, it has been found that the sequential chlorination must be conducted at a temperature above that temperature employed for the first chlorination, but below the temperature at which the crystalline polyolefin starting material has completely melted, to provide materials having the combination of desirable properties described herein. In this regard, it has been found that the temperature employed in such sequential chlorination must necessarily be greater than that employed in the initial chlorination to prevent the retention of excessive undesirable crystallinity with resultant formation of nonuniformly chlorinated polymer. Furthermore, if such temperature is above the temperature at which the crystalline polymer being chlorinated is completely melted, it has been found that particle size growth is greatly accelerated with resultant development of undesirable agglomeration of the polymer material.

Thus, the temperature employed in the herein described sequential suspension chlorination is that temperature at which a desirable balance between particle growth and destruction of crystallinity is obtained. Such temperature is, therefore, highly critical and is advantageously individually determined with respect to the polyolefin used, the desired chlorine content, and the desired physical properties of the so-formed chlorinated polymeric material. Generally, those crystalline polyolefins having higher molecular weights require higher second stage chlorination temperatures.

The vinyl chloride polymer compositions of this invention may be formulated and prepared in any conventional manner, as by dry blending the polymeric ingredients and milling them at elevated temperatures of between about 150 and 200° C. with conventionally employed compounding and milling rolls and the like apparatus. Such compositions are particularly useful for the provision of molten or extruded articles or otherwise shaped or fabricated articles of the rigid, chemically resistant type such as pipes, tubing, and blown bottles and the like.

It is further to be pointed out that other ingredients such as pigments and stabilizers are also generally incorporated into the compositions of the present invention. Exemplary of particularly useful stabilizers are the sulphur containing organo tin compounds including the alkyl tin mercaptides, among many others known in the art. Such stabilizers are preferably used in amounts between about 1 and 4 parts by weight per 100 parts of the vinyl chloride polymer constituent of the present invention.

The following examples wherein all parts and percentages are to be taken by weight, illustrate the present invention but are not to be construed as limiting its scope.

Example I

In each of a series of experiments an individual aqueous slurry comprising 3,200–3,600 grams of water and 160–180 grams of a polyethylene having an essentially linear and unbranched molecular structure containing less than about 1 methyl group per 100 methylene units in its molecule and having an average molecular weight of between about 33,000 and 225,000, and which had been prepared by the previously referred to Ziegler process using catalyst composed of trialkyl aluminum and titanium halide; was charged to a 1½ gallon autoclave with 6.4–7.2 grams of calcium chloride; about 0.5 cc of ditertiary butyl peroxide; and about 24–27 drops of a commercially available wetting agent. Each charge was then separately chlorinated, as a first suspension step, under chlorine pressure and at a temperature of about 90° C.–110° C. until a chlorine content of between about 5 and 18 percent was obtained. Following completion of such first chlorination step, each charge was further individually chlorinated in a second suspension chlorination step, at a temperature of about 120° C.–132° C. until a total chlorine content of between about 21.5 and 35 percent was obtained. Each chlorination product was then separately isolated by filtration, washed free of residual hydrochloric acid and dried.

The following Table I identifies the chlorinated olefin polymers prepared and summarizes their physical properties.

TABLE I

| Physical Properties | Chlorinated Polyethylene | | | | |
| --- | --- | --- | --- | --- | --- |
| | A | B [1] | C [2] | D | E |
| Percent Chlorine in 1st stage | 18 | 18 | 18 | 5 | 5 |
| Total percent Chlorine | 35 | 35 | 35 | 28 | 21.5 |
| Molecular Weight [3] | 225,000 | 102,000 | 110,000 | 65,000 | 33,000 |
| Percent Relative Crystallinity [4] | 2.5 | 0 | 0 | 5.6 | 6.0 |
| Percent Elongation (ASTM Test No. D–412–61T) | 600 | 750 | 775 | >950 | 825 |
| Tensile Strength, p.s.i. (ASTM Test No. D–412–61T) | 1,700 | 2,200 | 1,025 | >1,150 | 575 |
| 100 Percent Modulus, p.s.i. (ASTM Test No. D–412–62T) | 180 | 165 | 135 | 210 | 400 |

[1] 3.2 g. talc (2 parts per 100 parts PE) added to inhibit particle growth during chlorination.
[2] Based on a copolymer of ethylene and butene-1, containing about 1.8 weight percent of butene-1.
[3] As defined by Bueche, F. J. Chem. Physics, 20, 1959 (1952); 25, 599 (1956).
[4] Ratio of crystalline peak to the sum of the amorphous plus crystalline peak area, determined by conventional X-ray diffraction techs.

The chlorinated polyolefins specifically described above are inherently easily processable and are especially suited for blending with polymeric materials, such as polymers of vinyl chloride, to obtain improved, readily processable polymeric blends.

By way of comparison, it has been found that suspension chlorinated olefin polymers having molecular weights exceeding 1,000,000 cannot be readily fabricated by conventional techniques without the addition of significant amounts of plasticizers or other processing aids. By way of illustration, it has been found that nonplasticized chlorinated polyolefins of the present invention can be extruded through a standard Instron Rheometer orifice, using a 190° C. barrel temperature, at a 150 sec.$^{-1}$ shear rate with a resultant shear stress of from 10–55 p.s.i., whereas, under the same conditions, chlorinated polyethylenes having a molecular weight of from 1,000,000 to 5,000,000 are characterized by a shear stress of often greater than about 85 p.s.i. and sometimes cannot be made to pass through the orifice of the rheometer.

By way of further comparison, it has been found that utilization of the chlorinated polyolefins contemplated by the present invention as impact strength modifiers for the defined vinyl chloride polymers, produces polymeric blends which are much more easily processed than similar polymeric blends containing a chlorinated polyolefin having an average molecular weight of 1,000,000 or more.

cent chlorine and prepared from an olefin polymer having an average molecular weight in excess of 1,000,000.

In another comparison, a sample was prepared by the technique described herein wherein the chlorinated polyethylene was omitted.

The following Table II identifies the amounts and nature of chlorinated polyethylene used and summarizes the physical properties of the vinyl chloride polymer compositions. In such table, the column headings have the following meanings:

Izod impact strength—ASTM Test No. D–256.
Tensile strength, p.s.i.—ASTM Test No. D–638.
Flexural modulus of elasticity (p.s.i. × 10$^{-5}$)—ASTM Test No. D–790 Procedure A, Sect. (g)(1).
Flexural yield strength, p.s.i.—ASTM D–790 Procedure B, Sect. 11(c).
Heat deflection temperature (°C.)—ASTM Test No. D–648–56.

TABLE II

| | Chlorinated Polyethylene | | Physical Properties of Polymer Blend | | | | |
|---|---|---|---|---|---|---|---|
| Sample No. | Type | Amt. (pts. by wt./100 pts. of PVC) | Impact Strength (ft./lb./lb.(s)/inch notch) | Tensile Strength p.s.i. ×10$^{-3}$ | Flexural Modulus, p.s.i. ×10$^{-5}$ | Flexural Strength, p.s.i. ×10$^{-3}$ | Heat Deflection Temp., °C. |
| For Comparison: | | | | | | | |
| 1 | None | None | 0.7 | 9 | 4.2 | 14 | 73.5 |
| 2 | 40% chlorene and >1,000,000 mol. wt. | 5 | 1.7 | 7.8 | 4.5 | 12.7 | 70 |
| 3 | do | 7.5 | 2.4 | 7.4 | 4.0 | 10 | 68 |
| 4 | do | 10 | 4.8 | | | | |
| This Invention: | | | | | | | |
| 5 | A | 2.5 | 2.7 | 8.1 | 4.5 | 12 | 71 |
| 6 | A | 5 | 3.6 | 7.6 | 3.7 | 10 | 71 |
| 7 | A | 10 | 23.6 | 6.8 | 3.6 | 9.6 | 70 |
| 8 | B | 2.5 | 2.5 | 8.2 | 4.4 | 13 | 71.5 |
| 9 | B | 7.5 | 4.4 | 7.3 | 3.9 | 12 | 70 |
| 10 | B | 10 | 24 | 6.8 | 3.6 | 11.4 | 69 |
| 11 | C | 10 | 7.5 | | 3.4 | 10.5 | 69.5 |
| 12 | D | 10 | 13.9 | 6.7 | 3.5 | 11.5 | 71 |
| 13 | E | 10 | 17.3 | 6.5 | 3.5 | 11.9 | 70 |

By way of illustration, the polymer blends of this invention form a uniform melt when heated to temperatures normally used for the fabrication of polyvinyl chloride, i.e. temperatures of from about 160° C. to about 210° C., whereas polymer blends containing chlorinated polyolefins having a molecular weight in excess of about 1,000,000 contain unmelted solid particles of such chlorinated polyethylene, when subjected to the same following conditions.

Example II

In each of a series of additional experiments varying amounts of the chlorinated olefin polymers A through E of Example I were individually and separately admixed with a vinyl chloride homopolymer having an absolute viscosity in 2 percent o-dichlorobenzene solution at 120° C., of 1.90 to 2.05 cps. To each formulation was additionally added 2 parts, per 100 parts of vinyl chloride polymer, of an organo tin mercaptide stabilizer and 0.25 part, per 100 parts of vinyl chloride polymer, of a polyethylene wax having an average molecular weight of about 2000.

In each of the experiments individual 200 gram samples were prepared by admixture of the specified ingredients in a Waring blender for a period of one minute. The mixtures were then separately roll milled at 350° F. for 5–10 minutes.

In each instance a sheet (8" x 8" x 1/8") was pressed from the roll mill blankets using 5,000 to 10,000 pounds force for ten minutes while the press was heating up to 350° F., followed by application of 35,000 to 40,000 pounds force for ten minutes after the press reached 350° F. Each sheet was then cooled for ten minutes under 40,000 pounds force.

For purposes of comparison, a series of samples was prepared as described herein using a commercially available chlorinated polyethylene containing about 40 percent chlorine and prepared from an olefin polymer having The data set forth in Table II illustrates the unexpected improvement in impact strength found to be characteristic of vinyl chloride polymer compositions containing from between about 2.5 to 10 parts by weight of the required chlorinated polyethylene. It will further be noted that such improvement is realized without significant loss in other physical properties. Such data also illustrates the criticality of using the chlorinated olefin polymers specifically contemplated for use by the present invention. Similar desirable results are obtained using the required amounts of any of the chlorinated olefin polymers specifically referred to herein as comprising a part of the present invention.

What is claimed is:

1. A composition of matter comprising (1) a vinyl chloride polymer containing at least about 80 percent by weight of polymerized vinyl chloride in the polymer molecule with the remainder being at least one monoethylenically unsaturated comonomer, and (2) between about 2.5 and 10 parts by weight based on 100 parts by weight of said vinyl chloride polymer of a chlorinated olefin polymer having an essentially linear structure and a molecular weight of less than about 1,000,000, said olefin polymer being selected from the group consisting of polyethylene and interploymers containing at least about 90 mole percent of ethylene in the polymer molecule, with the remainder being at least one ethylencially unsaturated comonomer, said chlorinated olefin polymer being obtained by first chlorinating said olefin polymer in aqueous suspension at a temperature up to about 110° C. for a period sufficient to provide a chlorine content of not more than about 25 percent by weight based on the weight of said olefin polymer, and subsequently chlorinating said olefin polymer in aqueous suspension while in a particulate form at a temperature above that employed for the first chlorination but below the temperature at which the non-chlorinated crystalline olefin polymer has completely melted for a period sufficient to provide a combined chlorine content of between 20 and 38 percent by weight and wherein at least about 12 percent by weight of the chemically combined chlorine is introduced during the sequential chlorination; wherein said chlorinated olefin polymer contains from about 20 to 28 percent by weight of chemically combined chlorine when having a molecular weight of from about 20,000 to 40,000; from about 25 to 35 percent by weight of chemically combined chlorine when having a molecular weight of from about 40,000 to 100,000; and from 30 to 38 percent by weight when having a molecular weight in excess of about 100,000; and wherein said chlorinated olefin polymer has a 100 percent modulus of less than about 425 pounds per square inch when containing 20 percent to 22 percent of chemically combined chlorine; a 100 percent modulus of less than about 375 pounds per square inch when containing from 22 to 25 percent by weight of chemically combined chlorine; a 100 percent modulus of less than about 300 pounds per square inch when containing from 25 to 28 percent by weight of chemically combined chlorine; a 100 percent modulus of less than about 250 pounds per square inch when containing from 28 to 30 percent by weight of chemically combined chlorine; and a 100 percent modulus of less than about 200 pounds per square inch when containing from 30 to 38 percent by weight of chemically combined chlorine.

2. The composition of claim 1 wherein said vinyl chloride polymer is polyvinylchloride.

3. The composition of claim 2 wherein said chlorinated olefin polymer is chlorinated polyethylene.

4. A process of preparing essentially rigid, readily processable, thermoplastic vinyl chloride polymer compositions of improved impact strength comprising essentially forming an intimate fusion blend of (1) a vinyl chloride polymer consisting of at least 80 percent by weight of polymerized vinyl chloride in the polymer molecule with the remainder being at least one monoethylenically unsaturated comonomer, and (2) between about 2.5 and 10 parts by weight per 100 parts based on said vinyl chloride polymer of a chlorinated olefin polymer having an essentially linear structure and a molecular weight of less than about 1,000,000, said olefin polymer being selected from the group consisting of polyethylene and interpolymers containing at least about 90 mole percent of ethylene in the polymer molecule, with the remainder being at least one ethylencially unsaturated comonomer, said chlorinated olefin polymer being obtained by first chlorinating said olefin polymer in aqueous suspension at a temperature up to about 110° C. for a period sufficient to provide a chlorine content of not more than about 25 weight percent based on the weight of said polymer, and subsequently chlorinating said olefin polymer in aqueous suspension while in a particulate form at a temperature above that employed for the first chlorination but below the temperature at which the non-chlorinated crystalline olefin polymer has completely melted, for a period sufficient to provide a combined chlorine content of between 20 and 38 percent by weight; wherein at least about 12 percent by weight of chemically combined chlorine is introduced during the sequential chlorination; wherein said chlorinated olefin polymer contains from about 20 to 28 percent by weight of chemically combined chlorine when having a molecular weight of from about 20,000 to 40,000; from about 25 to 35 percent by weight of chemically combined chloride when having a molecular weight of from about 40,000 to 100,000; and from 30 to 38 percent by weight when having a molecular weight in excess of about 100,000; and wherein said chlorinated olefin polymer has a 100 percent modulus of less than about 425 pounds per square inch when containing from 20 to 22 percent by weight of chemically combined chlorine; a 100 percent modulus of less than about 375 pounds per square inch when containing from 22 to 25 percent by weight of chemically combined chlorine; a 100 percent modulus of less than about 300 pounds per square inch when containing from 25 to 28 percent by weight of chemically combined chlorine; a 100 percent modulus of less than about 250 pounds per square inch when containing from 28 to 30 percent by weight of chemically combined chlorine; and a 100 percent modulus of less than about 200 pounds per square inch when containing from 30 to 38 percent by weight of chemically combined chlorine.

5. The process of claim 4 wherein said vinyl chloride polymer is polyvinyl chloride.

6. The process of claim 5 wherein said chlorinated olefin polymer is chlorinated polyethylene.

References Cited

UNITED STATES PATENTS

| | | |
|---|---|---|
| 3,076,781 | 2/1963 | Frey et al. |
| 3,209,055 | 9/1965 | Hedberg et al. _____ 260—897 |
| 3,244,774 | 4/1966 | Kaupp et al. _____ 260—897 |
| 3,291,863 | 12/1966 | Frey et al. _____ 260—897 |

MURRAY TILLMAN, Primary Examiner

K. E. KUFFNER, Assistant Examiner

U.S. Cl. X.R.

260—45.75, 890.899